US008958434B2

(12) United States Patent
Ganesan

(10) Patent No.: US 8,958,434 B2
(45) Date of Patent: *Feb. 17, 2015

(54) METHOD OF DETERMINING BROADBAND CONTENT USAGE WITHIN A SYSTEM

(71) Applicant: Hava Corporation, Cupertino, CA (US)

(72) Inventor: Vasudevan Ganesan, Cupertino, CA (US)

(73) Assignee: Vasu Networks Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/944,500

(22) Filed: Jul. 17, 2013

(65) Prior Publication Data

US 2013/0304873 A1   Nov. 14, 2013

Related U.S. Application Data

(63) Continuation of application No. 11/262,156, filed on Oct. 27, 2005, now Pat. No. 8,514,867, which is a continuation-in-part of application No. 11/031,498, filed on Jan. 6, 2005, now Pat. No. 7,991,399.

(60) Provisional application No. 60/652,258, filed on Feb. 11, 2005, provisional application No. 60/534,466, filed on Jan. 6, 2004.

(51) Int. Cl.
*H04W 4/00* (2009.01)
*H04L 29/06* (2006.01)
(Continued)

(52) U.S. Cl.
CPC ............... *H04L 65/80* (2013.01); *G06Q 30/02* (2013.01); *H04L 29/06027* (2013.01); *H04L 65/4092* (2013.01); *H04L 65/607* (2013.01); *H04L 12/2856* (2013.01)

USPC ......................................................... 370/401

(58) Field of Classification Search
None
See application file for complete search history.

(56) References Cited

U.S. PATENT DOCUMENTS 6,009,328 A   12/1999   Muszynski
6,175,737 B1   1/2001   Kao
(Continued)

FOREIGN PATENT DOCUMENTS

DE   200310113 UI   1/2004
EP      0936777 A1   8/1999
(Continued)

OTHER PUBLICATIONS

3GPP Organization Project, "3rd Generation Partnership Project-;Technical Specification Group Services and System Aspects Service aspects; Handover requirements between UTRAN and GERAN or other radio systems (Release 8)", Mar. 2006, pp. 1-20.
(Continued)

*Primary Examiner* — John Blanton
(74) *Attorney, Agent, or Firm* — Haverstock & Owens LLP

(57) ABSTRACT

An end user network access point monitors and collects usage statistics associated with all content accessed by the end user devices through the access point. One or more external control servers collect the usage statistics from each access point, thereby compiling macro-level statistics related to content accessed by the end user devices. The one or more external control servers can be co-located with the network equipment of the broadband infrastructure provider, or the one or more external control servers can be independent of the broadband infrastructure.

22 Claims, 3 Drawing Sheets

(51) Int. Cl.
*G06Q 30/02* (2012.01)
*H04L 12/28* (2006.01)

(56) References Cited

U.S. PATENT DOCUMENTS

| | | |
|---|---|---|
| 6,195,543 B1 | 2/2001 | Granberg |
| 6,473,413 B1 | 10/2002 | Chiou et al. |
| 6,515,983 B1 | 2/2003 | Utas |
| 6,553,022 B2 | 4/2003 | Hartmaier |
| 6,584,087 B1 | 6/2003 | Czaja et al. |
| 6,754,833 B1 | 6/2004 | Black et al. |
| 6,795,700 B2 | 9/2004 | Karaoguz et al. |
| 6,862,444 B2 | 3/2005 | Karaoguz et al. |
| 6,996,107 B2 | 2/2006 | Janoska |
| 7,127,232 B2 | 10/2006 | O'Neil et al. |
| 7,142,847 B2 | 11/2006 | Umeda et al. |
| 7,254,119 B2 | 8/2007 | Jiang et al. |
| 7,382,763 B2 | 6/2008 | Ludwig et al. |
| 7,398,088 B2 | 7/2008 | Belkin et al. |
| 7,483,984 B1 | 1/2009 | Jonker et al. |
| 7,512,796 B2 | 3/2009 | Haverinen et al. |
| 8,041,360 B2 | 10/2011 | Ibe et al. |
| 2001/0049790 A1 | 12/2001 | Faccin et al. |
| 2002/0078174 A1 | 6/2002 | Sim et al. |
| 2002/0085516 A1 | 7/2002 | Bridgelall |
| 2002/0114305 A1 | 8/2002 | Oyama et al. |
| 2002/0147008 A1 | 10/2002 | Kallio |
| 2002/0150228 A1 | 10/2002 | Umeda et al. |
| 2003/0012350 A1 | 1/2003 | Wong et al. |
| 2003/0083079 A1 | 5/2003 | Clark et al. |
| 2003/0086366 A1 | 5/2003 | Branlund et al. |
| 2003/0087629 A1 | 5/2003 | Juitt et al. |
| 2003/0112766 A1 | 6/2003 | Riedel et al. |
| 2003/0157899 A1 | 8/2003 | Trossen et al. |
| 2003/0177196 A1 | 9/2003 | Bhasin et al. |
| 2003/0185172 A1 | 10/2003 | Rue |
| 2003/0217007 A1 | 11/2003 | Fukushima et al. |
| 2003/0217091 A1 | 11/2003 | Echigo et al. |
| 2003/0224792 A1 | 12/2003 | Verma et al. |
| 2003/0232615 A1 | 12/2003 | Kim et al. |
| 2004/0005878 A1 | 1/2004 | Olin et al. |
| 2004/0030791 A1 | 2/2004 | Dorenbosch et al. |
| 2004/0085959 A1 | 5/2004 | Ohkawa |
| 2004/0087307 A1 | 5/2004 | Ibe et al. |
| 2004/0105424 A1 | 6/2004 | Skoczkowski et al. |
| 2004/0114559 A1 | 6/2004 | Wang |
| 2004/0127208 A1 | 7/2004 | Nair et al. |
| 2004/0132427 A1 | 7/2004 | Lee et al. |
| 2004/0137902 A1 | 7/2004 | Chaskar et al. |
| 2004/0174880 A1 | 9/2004 | White et al. |
| 2004/0203666 A1 | 10/2004 | Foster et al. |
| 2004/0203788 A1 | 10/2004 | Fors et al. |
| 2004/0203802 A1 | 10/2004 | McCormick et al. |
| 2004/0204097 A1 | 10/2004 | Scheinert et al. |
| 2004/0218575 A1 | 11/2004 | Ibe et al. |
| 2004/0229618 A1 | 11/2004 | Adatrao et al. |
| 2005/0044138 A1 | 2/2005 | Albert et al. |
| 2005/0059400 A1 | 3/2005 | Jagadeesan et al. |
| 2005/0147049 A1 | 7/2005 | Ganesan |
| 2005/0149740 A1 | 7/2005 | Kotzin et al. |
| 2006/0040711 A1 | 2/2006 | Whistler |
| 2006/0050663 A1 | 3/2006 | Ganesan |
| 2006/0050687 A1 | 3/2006 | Ganesan |
| 2006/0050721 A1 | 3/2006 | Ganesan |
| 2006/0080423 A1 | 4/2006 | Brewer et al. |
| 2006/0146767 A1 | 7/2006 | Moganti |
| 2006/0234678 A1 | 10/2006 | Juitt et al. |
| 2006/0291455 A1 | 12/2006 | Katz et al. |
| 2007/0076665 A1 | 4/2007 | Nair et al. |
| 2007/0112948 A1 | 5/2007 | Uhlik |
| 2007/0124490 A1 | 5/2007 | Kalavade et al. |
| 2007/0249390 A1 | 10/2007 | Purkayastha et al. |
| 2009/0070489 A1 | 3/2009 | Lu et al. |
| 2010/0074228 A1 | 3/2010 | Hicks et al. |
| 2011/0010282 A1 | 1/2011 | Olin et al. |

FOREIGN PATENT DOCUMENTS

| | | |
|---|---|---|
| EP | 1471665 A1 | 10/2004 |
| GB | 2287858 A | 9/1995 |
| JP | 200226994 A | 1/2002 |
| JP | 2004320473 A | 11/2004 |
| WO | 03056719 A1 | 7/2003 |
| WO | 2004013998 A2 | 2/2004 |
| WO | 2004057903 A1 | 7/2004 |

OTHER PUBLICATIONS

3GPP Organization Project, "3rd Generation Partnership Project; Technical Specification Group Services and System Aspects Service aspects; Service principles (Release 8)", Mar. 2006, pp. 1-45.

3GPP Organization Project, 3rd Generation Partnership Projects;Technical Specification Group Services and System Aspects; Service Requirements for the All-IP Network (AIPN); V8.0. 0, Stage 1, (Release 8), p. 1-24.

"Unlicensed Mobile Access (UMA); Protocols (Stage 3)", R1.0.4, May 2, 2005, pp. 1-162.

METHOD OF DETERMINING BROADBAND CONTENT USAGE WITHIN A SYSTEM

RELATED APPLICATIONS

This Patent Application is a continuation application of co-pending U.S. patent application Ser. No. 11/262,156, filed on Oct. 27, 2005, and entitled "METHOD OF DETERMINING BROADBAND CONTENT USAGE WITHIN A SYSTEM," which claims priority of U.S. provisional application Ser. No. 60/652,258, filed Feb. 11, 2005, and entitled "METHOD OF AND APPARATUS FOR CONTROLLING BROADBAND ACCESS AND DISTRIBUTION OF CONTENT AND COMMUNICATIONS THROUGH AN ACCESS POINT," by the same inventors. This application incorporates U.S. patent application Ser. No. 11/262,156 and U.S. provisional application Ser. No. 60/652,258 in their entirety by reference. The U.S. patent application Ser. No. 11/262,156 is also a continuation-in-part of U.S. patent application Ser. No. 11/031,498, filed Jan. 6, 2005, and entitled "TELEPHONE WITH AUTOMATIC SWITCHING BETWEEN CELLULAR AND VOIP NETWORKS", which is hereby incorporated by reference. U.S. patent application Ser. No. 11/031,498 claims priority of U.S. provisional application Ser. No. 60/534,466, filed Jan. 6, 2004, and entitled "RADIOTELEPHONE WITH AUTOMATIC SWITCHING BETWEEN CELLULAR AND WI-FI NETWORKS USING WI-FI SIGNAL STRENGTH VALUES", the content of which is incorporated herein by reference in its entirety.

FIELD OF THE INVENTION

The present invention relates to a method of and an apparatus for controlling broadband access and distribution of content and communications through an access point. In particular, the present invention relates to a method of and apparatus for controlling the quality of content provided over a broadband infrastructure through an access point to a plurality of end user network devices.

BACKGROUND OF THE INVENTION

Current broadband transmission occurs from broadband infrastructure providers to end users via such infrastructure as telephone DSL, TV cable, satellite, etc. Broadband content, such as movies, music, TV shows, web access, etc., that is transmitted over the broadband transmission infrastructure is provided by content providers. Some broadband infrastructure providers determine which content providers can provide content over their networks. For example, a cable television service provider determines which channels, such as HBO, ESPN, or CNN, are available to their end user customers.

Current state of the art of a QoS (Quality of Service) is available for the broadband transmission infrastructure, that is the physical infrastructure from the broadband infrastructure service provider location to end user premise located broadband network devices, such as a DSL/cable termination, DSL/cable modem, wireless/wired router, or general access point. The QoS is applied to the physical transmission medium, and as such, the quality of all content provided over any given physical medium is dependent on the QoS of that given physical medium. All content provided over the given physical medium is subject to the same QoS.

However, the broadband infrastructure provider has no control over the actual content that is provided by the content providers. The broadband infrastructure provider may wish to manage, or even block, certain content within the content provided by the content provider, but is unable to modify the content provided. A QoS is not available for broadband "content", especially from the end user broadband network device to an end user device such as a computer, TV, or telephone. In other words, current QoS methodologies enable broadband transmission infrastructures with required quality levels, but do not provide selective control of the "content" that is transmitted over these same infrastructures.

SUMMARY OF THE INVENTION

The present invention generally describes a method of and a system for broadband/infrastructure providers to set, control, and operate a coercive/disruptive controller (CDC) to manage and provide broadband content to an end user device.

Embodiments of the present invention are directed to a controller that controls broadband content and communication from an end user broadband network access device to an end user device. Examples of an end user broadband network access device include, but are not limited to, a DSL modem, a cable modem, a DSL termination, a cable termination, a wireless router, or a wired router. In general, the end user broadband network device is an access point to the broadband infrastructure. Examples of an end user device include, but are not limited to, a computer, a network appliance, a television, a telephone, a personal digital assistant (PDA), or any device capable of receiving broadband content. Communication between the access point and the end user device preferably includes a broadband connection, either wired or wireless. Wireless transmissions can be made over public standard based IEEE 802.11 a/b/g, Wi-Max, or any other wireless based transmission media. Wired transmissions can be made over local area network (LAN), wide area network (WAN), or any other wired transmission media.

In one embodiment, the controller is integrated within the access point and utilizes content parameters and operation logic to manage and control broadband content transmitted to the end user devices. In another embodiment, the controller is a stand alone device coupled to the access point within a home or enterprise network. The controller either operates independently or is dynamically set and controlled by a remotely coupled external controller or server. Using the controller, broadband content and communication for end user devices is seamlessly, dynamically, concurrently, and coercively/disruptively controlled.

The access point and the controller of the present invention preferably enable broadband/infrastructure providers to dynamically manage and administer the broadband content provided to the end user devices. For example, through the use of a local controller and/or an externally coupled coercive/disruptive controller, QoS content parameters are set/reset, assigned/reassigned for broadband content provided by any given content provider. QoS parameters define, for example, jitter, priority, level of filtering, etc. Broadband content is managed and administered according to the QoS content parameters, where the QoS content parameters are content specific, that is based on content origination, specific content, and/or specific content characteristics. As such, the QoS content parameters are adjusted based on the broadband content, making the QoS related to the broadband content independent of the content quality provided by the content provider. In this manner, the access point provides a content-specific QoS, where the QoS is applied to the actual content, not to the physical media that delivers the content.

Additionally, the access point monitors and collects usage statistics associated with all content accessed by the end user devices through the access point. One or more external control servers collect the usage statistics from each access point, thereby compiling macro-level statistics related to content accessed by end user devices. The one or more external control servers can be co-located with the network equipment of the broadband infrastructure provider, or the one or more external control servers can be independent of the broadband infrastructure.

BRIEF DESCRIPTION OF THE SEVERAL VIEWS OF THE DRAWINGS

The present invention is described relative to the several views of the drawings. Where appropriate and only where identical elements are disclosed and shown in more than one drawing, the same reference numeral will be used to represent such identical elements.

DETAILED DESCRIPTION OF THE INVENTION

Figure 1:
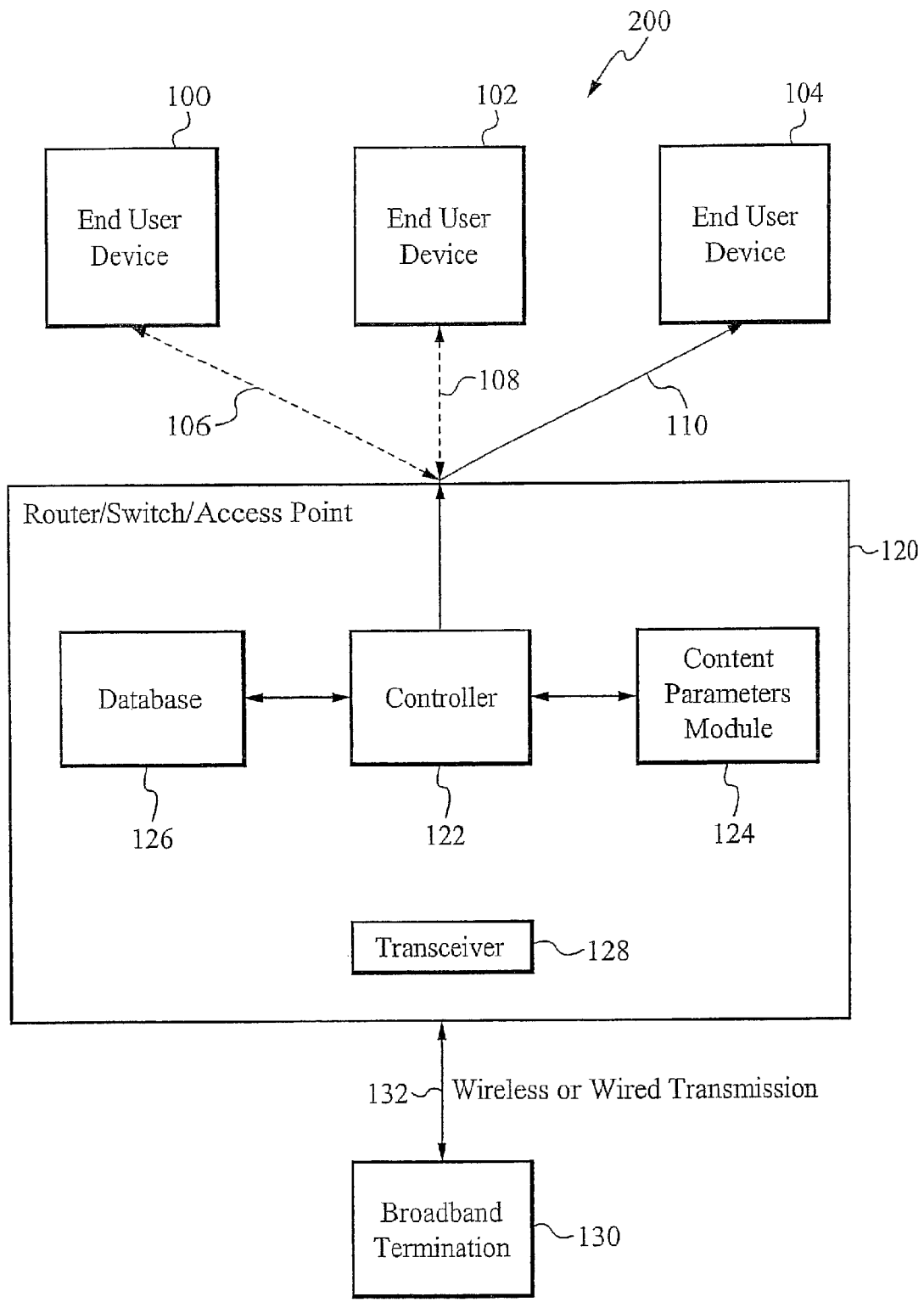
FIG. 1 illustrates an exemplary block diagram of one or more end user devices coupled to an access point of the present invention.

FIG. 1 illustrates an exemplary block diagram of one or more end user devices 100-104 coupled to an access point 120 of the present invention. A broadband content controller 122 is preferably integrated within the access point 120. Alternatively, the broadband content controller is implemented as a stand alone end user network element, wireless or wired, which is configured within a home or enterprise network associated with the end user devices. In this alternative embodiment, the broadband content controller is coupled to a conventional end user broadband network access device to manage the content provided to the end user devices, as will be explained in greater detail below.

The access point 120 also includes a transceiver 128 adapted to transmit signals to and receive signals from network connections 106, 108, 110, and 132. Each of the network connections 106, 108, 110, and 132 can be either a wireless connection or a wired connection. As such, the transceiver 128 is configured for both wired and wireless network communications.

Each of the end user devices can be configured for wireless, wired, or both wireless and wired communications. Exemplary end user devices include, but are not limited to, computers, televisions, music players/recorders, PDAs, telephones, or any conventional end user device capable of receiving broadband content. The end user device can also be a mobile communication device configured to automatically switch an existing communication from a cellular network to a wireless IP network, or to switch an existing communication from an IP network to a cellular network. Such a mobile communication device is described in co-pending and co-owned U.S. patent application Ser. No. 11/031,498, filed Jan. 6, 2005, and entitled "TELEPHONE WITH AUTOMATIC SWITCHING BETWEEN CELLULAR AND VOIP NETWORKS", which is hereby incorporated by reference.

As shown in FIG. 1, end user device 100 is a wireless device coupled to the access point 120 via wireless connection 106. Similarly, the end user device 102 is a wireless device coupled to the access point 120 via the wireless connection 108. The end user device 104 is a wired device coupled to the access point 120 via the wired connection 110.

It is understood that the specific types of end user devices 100, 102, and 104, and the specific transmission connections 106-110 made between the end user devices 100-104 and the access point 120 described above in relation to FIG. 1 are for exemplary purposes only.

When the connection between an end user device, such as end user device 104, and the access point 120, is a wired connection, such as wired connection 110, the end user device 104 preferably functions as a network access terminal extension, for example a telephone cradle.

The access point 120 is coupled to a broadband termination block 130 via the broadband connection 132. The broadband connection 132 can be a wired connection or a wireless connection. A wired connection to access point 120 can be configured according to any conventional wired transmission protocol including, but not limited to, those used in LANs and WANs. A wireless connection to access point 120 can be configured according to any conventional wireless transmission protocol including, but not limited to, IEEE 802.11 a/b/g and Wi-Max.

The broadband termination block 130 is either a physical device or a logical node where broadband content is received from an external source, such as a broadband infrastructure provider, and then supplied to the access point 120. The broadband content includes content data, such as audio content data and/or video content data, as well as content header data that provides information related to the accompanying audio/video content data. Examples of content header data include content origination address, content specific information, video parameters, audio parameters, and transmission media-specific parameters. The broadband content is provided from the broadband termination 130 to the access point 120. As the broadband termination block 130 can be considered a logical node, in an alternative embodiment, the broadband termination block 130 is included within the access point 120.

The broadband content controller 122 sets quality of service (QoS) transmission characteristics associated with transmission of the received broadband content to the end user devices 100-104. The QoS transmission characteristics can differ or be the same depending on whether the connection between the access point 120 and the end user devices 100-104 are wired or wireless. The transmission characteristics are also determined by the broadband content origination and by the nature of the audio/video content data. A content parameters module 124 maintains various content parameter values associated with the QoS transmission characteristics. These content parameter values are sent by the broadband content controller 122 to the content parameter module 124, or are stored content parameter values are sent by the content parameter module 124 to the broadband content controller 122. Preferably, the content parameter values maintained by the content parameter module 124 are dynamically set by the broadband content controller 122. The content parameter values are used by the controller 122 to manage the content provided to the end user device 100-104. Content received by the access point 120 from the broadband termination block 130 is monitored for its source. That is, each content is associated with a specific content provider. A QoS is associated with each content provider so that content parameter values associated with each content provider are set according to the QoS of that content provider.

In operation, the broadband content controller 122 controls the transmission of broadband content and communications to the end user devices 100-104. The controller 122 is preferably integrated within the access point 120. Alternatively, the controller 122 is included within a stand-alone network device coupled to an end user broadband network element, where the stand alone network device and the end user broadband network element are included within a home or enterprise network. The controller 122 monitors broadband content received from the broadband termination block 130 to determine a content source of the broadband content. Using the determined content source, the controller 122 retrieves content parameter values from the content parameters module 124, where the retrieved content parameter values are associated with the determined content source. The retrieved content parameter values dictate the QoS transmission characteristics to be executed by the controller, as applied to the received broadband content. The QoS transmission characteristics can include, but are not limited to, a processing rate, a priority level, or a degree of filtering. Where the access point 120 receives more than one data stream of broadband content, the priority level indicates which data stream is processed first, which is processed second, and so on. The access point 120 can also include various processors with different processing speeds, where the content parameter values can dictate which processor is to be used. The access point 120 can also include one or more filter types, where the content parameter values can dictate whether or not the broadband content is filtered for noise, what quality filter is used, or whether or not the broadband content is blocked entirely.

Using the content parameter values to implement the QoS transmission characteristics for a given content provider, the controller processes the received broadband content before the content is sent to one or more of the end user devices 100-104. In this manner, the actual content is managed prior to delivery to the end user device.

Preferably, each access point 120 is also configured to collect usage statistics associated with all content that is accessed by the end user devices 100-104. The usage statistics represent information related to the content transmitted to the end user devices 100-104, and as such, the usage statistics represent the content usage patterns of the users of the end user devices 100-104. The usage statistics are stored in a database 126.

Figure 2:
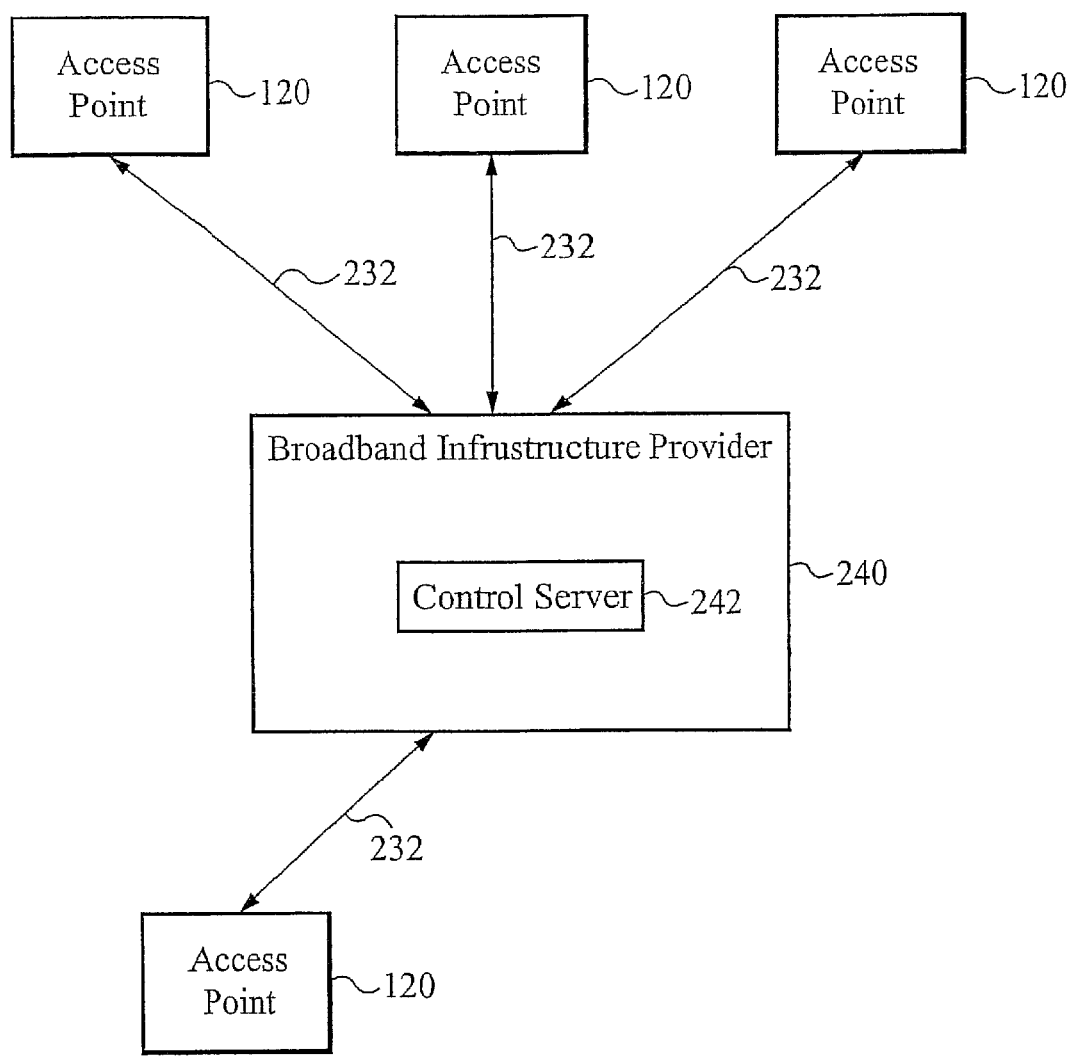
FIG. 2 illustrates an exemplary block diagram of a system implemented according to the present invention.

FIG. 2 illustrates an exemplary block diagram of a system including multiple access points 120 and an external control server 242. Preferably, the control server 242 is co-located at a central office of a broadband infrastructure provider 240. Alternatively, the control serve 242 is implemented as a stand alone end user network element coupled to each of the access points 120. Although the system is shown in FIG. 2 as each access point 120 coupled directly to the control server 242, alternative embodiments are contemplated in which an access point is indirectly coupled to the control server via one or more intermediate access points. The network connections 232 are configured using any conventional communications media, either wireless or wired. The network connections 232 can be either the same network connections, such as network connection 232, used to transmit broadband content from the broadband infrastructure provider 240 to the access points 120, or the network connections 232 can be independent of the network connections used to transmit broadband content from the broadband infrastructure provider 240 to the access points 120.

In the preferred embodiment, the control server 242 provides control commands and instructions to the controller 122 (FIG. 1) within each access point 120. In part, these control commands and instructions set, reset, assign, and reassign the QoS transmission characteristics associated with transmission of the broadband content from access point 120 to the end user devices 100-104 (FIG. 1). The control server 242 maintains control of the content parameter values, which dictate the QoS transmission characteristics, stored in the content parameters module 124 (FIG. 1) of each access point 120. The access point 120 then processes the broadband content according to the stored content parameter values, as described above in relation to FIG. 1. The access point 120 administers the control commands and instructions sent from the control server 242 by dynamically managing and processing the broadband content before it is transmitted to the end user devices 100-104 (FIG. 1).

The control server 242 also functions as a centralized collection system that collects the usage statistics from each of the access points 120 in the system. The control server 242 maintains a database of the collected usage statistics that provides compiled usage information for all content distributed through the access points 120. Although the control server 242 is shown in FIG. 2 as a single server, the control server 242 can include more than one server networked together. In this case, the compiled usage statistics can be maintained in one of the servers, or the compiled usage statistics can be copied such that two or more of the networked servers maintain a copy of the compiled usage statistics.

In operation, the control server 242 preferably manages QoS transmission characteristics of the broadband content provided by access points 120 to any end user device coupled to receive the broadband content. The access points 120 preferably process and then transmit the broadband content according to the QoS transmission characteristics provided by the control server 242. The control server 242 also collects the usage statistics stored by each of the access points 120. These usage statistics are compiled to form macro-level content usage patterns.

Figure 3:
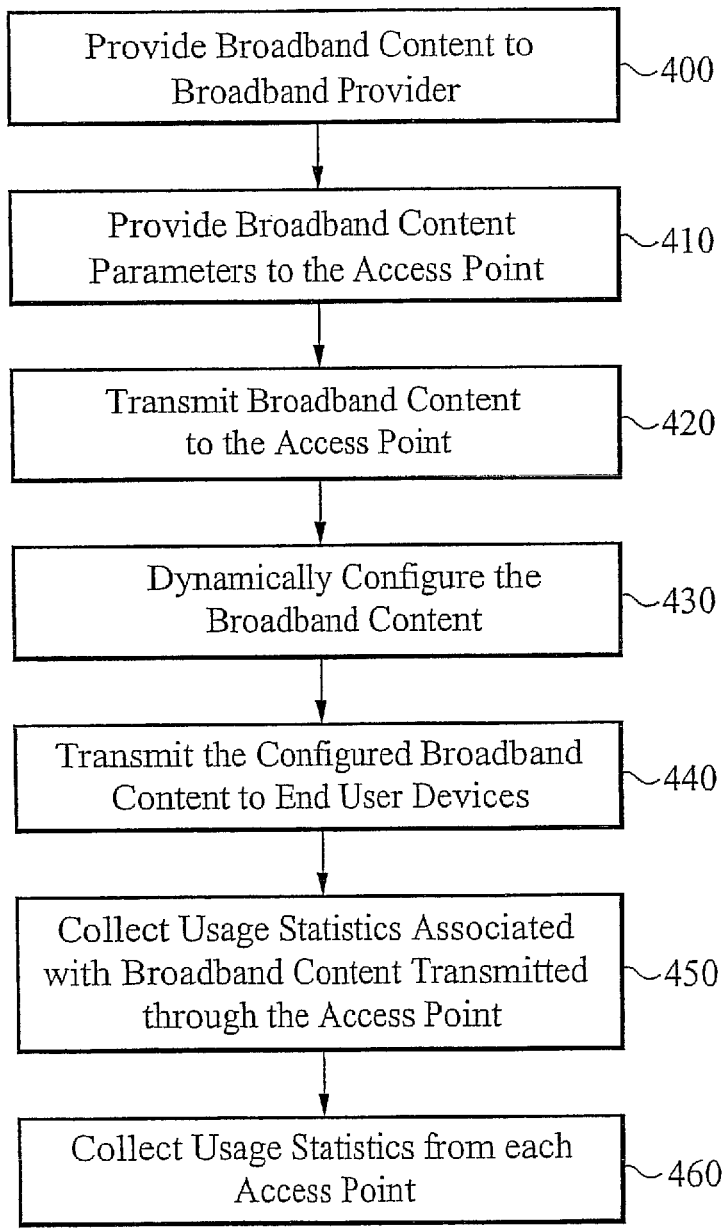
FIG. 3 illustrates an exemplary methodology for dynamically configuring broadband content transmitted to end user devices.

FIG. 3 illustrates an exemplary methodology for dynamically configuring broadband content transmitted to end user devices by an access point. At the step 400, broadband content is provided to a broadband provider. At the step 410, broadband content parameters are set and maintained within the access point. In one embodiment, management and administration of the broadband content parameters is controlled by an external control server. In another embodiment, a broadband content controller within the access point independently sets and defines the broadband content parameter values. At the step 420, the broadband content is transmitted by the broadband provider to the access point. The access point is preferably an end user broadband network element, which can also function as a broadband termination point.

At the step 430, the broadband content is dynamically configured within the access point, where the broadband content is configured according to the broadband content parameters. The broadband content parameters define content-specific QoS transmission characteristics which are to be applied on a content by content basis. At the step 440, the configured broadband content is transmitted from the access point to one or more end user devices. The configured broadband content is transmitted to the end user devices over a wired or wireless connection.

At the step 450, each access point collects usage statistics associated with the content transmitted through the access point to the end user devices. At the step 460, an external control server collects and collates the usage statistics from each of the access points.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

I claim:

1. An apparatus to collect usage statistics related to broadband content provided to one or more end user devices, the apparatus comprising:
   a. a controller to access one or more content data streams over a transmission infrastructure having a first quality of service that is applied to all of the content streams transmitted over the infrastructure, wherein each of the content data streams is identified by a content provider, and further wherein the controller is configured to receive a request for specific content from an end user device, to apply a second quality of service to the content data stream based on the content provider and to selectively transmit one of the one or more content data streams to the end user device according to the request, wherein the first quality of service is different than the second quality of service.

2. The apparatus of claim 1 further comprising a transceiver configured for wireless or wired network communications.

3. The apparatus of claim 1 wherein the apparatus comprises a wired router or a wireless router.

4. The apparatus of claim 1 wherein the apparatus comprises a wired modem or a wireless modem.

5. The apparatus of claim 1 wherein the apparatus comprises a wireless access point.

6. The apparatus of claim 1 wherein the apparatus comprises a broadband network access point.

7. The apparatus of claim 1 wherein the controller is configured to apply the second quality of service to the content data stream independent of the content provider.

8. The apparatus of claim 1 wherein the controller is configured to apply the second quality of service to the content data stream based on the content.

9. The apparatus of claim 1 wherein the controller is configured to apply the second quality of service to the content data stream based on the content provider, the content and content characteristics.

10. A system to collect usage statistics related to broadband content provided to a plurality of end user devices, the system comprising:
    a. a plurality of end user network access points, wherein each end user network access point comprises a controller to access one or more content data streams, wherein each of the content data streams is identified by a content provider, and further wherein the controller is configured to receive a request for specific content from an end user device, to apply a second quality of service to the broadband content data stream based on the content provider and to selectively transmit one of the one or more content data streams to the end user device according to the request; and
    b. a transmission infrastructure having a first quality of service that is applied to all of the content streams transmitted over the infrastructure;
    wherein the first quality of service is different than the second quality of service.

11. The system of claim 10 wherein the end user device comprises one of a computer, a television, a telephone, a personal digital assistant, and music players/recorders.

12. The system of claim 10 wherein the end user device is coupled to a first network access point by a wireless connection or by a wired connection.

13. The system of claim 10 wherein a first end user network access point comprises a wired router or a wireless router.

14. The system of claim 10 wherein a first end user network access point comprises a wired modem or a wireless modem.

15. The system of claim 10 wherein a first end user network access point comprises a wireless access point.

16. The system of claim 10 wherein the controller is configured to apply the second quality of service to the content data stream independent of the content provider.

17. The system of claim 10 wherein the controller is configured to apply the second quality of service to the content data stream based on the content.

18. The system of claim 10 wherein the controller is configured to apply the second quality of service to the content data stream based on the content provider, the content and content characteristics.

19. A method of collecting usage statistics related to broadband content provided to a plurality of end user devices, the method comprising:
    a. accessing one or more content data streams over a transmission infrastructure having a first quality of service that is applied to all of the content streams transmitted over the infrastructure by a local end user network access point, wherein each content data stream is identified by a content provider;
    b. receiving a request for specific content from an end user device by the local end user network access point;
    applying a second quality of service to the content data stream based on the content provider, wherein the first quality of service is different than the second quality of service; and
    c. selectively transmitting one of the one or more content data streams to the end user device according to the request.

20. The method of claim 19 wherein the second quality of service is applied to the content data stream independent of the content provider.

21. The method of claim 19 wherein the second quality of service is applied to the content data stream based on the content.

22. The method of claim 19 wherein the second quality of service is applied to the content data stream based on the content provider, the content and content characteristics.

* * * * *